United States Patent
Kemp et al.

(10) Patent No.: US 7,292,981 B2
(45) Date of Patent: Nov. 6, 2007

(54) SIGNAL VARIATION FEATURE BASED CONFIDENCE MEASURE

(75) Inventors: Thomas Kemp, Esslingen (DE); Yin Hay Lam, Stuttgart (DE); Krzysztof Marasek, Warsaw (PL)

(73) Assignee: Sony Deutschland GmbH, Cologne (DE)

( * ) Notice: Subject to any disclaimer, the term of this patent is extended or adjusted under 35 U.S.C. 154(b) by 77 days.

(21) Appl. No.: 10/957,816

(22) Filed: Oct. 4, 2004

(65) Prior Publication Data

US 2005/0114135 A1    May 26, 2005

(30) Foreign Application Priority Data

Oct. 6, 2003    (EP)    ................... 03022646

(51) Int. Cl.
*G10L 25/14*    (2006.01)

(52) U.S. Cl. ............ 704/256; 236/238; 236/239

(58) Field of Classification Search .......... 704/256, 704/233, 239, 236
See application file for complete search history.

(56) References Cited

U.S. PATENT DOCUMENTS

| | | | |
|---|---|---|---|
| 4,718,095 A * | 1/1988 | Asakawa et al. | 704/251 |
| 4,790,017 A * | 12/1988 | Hinton | 704/243 |
| 4,975,959 A * | 12/1990 | Benbassat | 704/240 |
| 5,845,047 A * | 12/1998 | Fukada et al. | 704/268 |
| 6,292,775 B1 * | 9/2001 | Holmes | 704/209 |
| 6,570,991 B1 * | 5/2003 | Scheirer et al. | 381/110 |
| 6,794,197 B1 * | 9/2004 | Indermuhle et al. | 436/174 |
| 6,999,925 B2 * | 2/2006 | Fischer et al. | 704/243 |
| 2002/0133340 A1 * | 9/2002 | Basson et al. | 704/235 |

FOREIGN PATENT DOCUMENTS

EP    1 189 202    3/2002

OTHER PUBLICATIONS

Schaaf T et al: "Confidence Measures for Spontaneous Speech Recognition" 1997 IEEE International Conference on Acoustics, Speech, and Signal Processing. Speech Processing. Munich, Apr. 21-24, 1997, (ICASSP), Los Alamitos, IEEE Comp. Soc. Press, US, vol. 2, Apr. 21, 1997, pp. 875-878, XP000822587.

Moreau N et al: "Use of a Confidence Measure Based on Frame Level Likelihood Ratios for the Rejection of Incorrect Data" 6th European Conference on Speech Communication and Technology, Eurospeech '99. Budapest, Hungary (Eurospeech), Bonn: ESCA, DE, vol. 1 of 6, Sep. 5, 1999, pp. 291-294, XP001076108.

(Continued)

*Primary Examiner*—Richemond Dorvil
*Assistant Examiner*—Qi Han
(74) *Attorney, Agent, or Firm*—Oblon, Spivak, McClelland, Maier & Neustadt, P.C.

(57) ABSTRACT

A method for predicting a misrecognition in a speech recognition system, is based on; the insight that variations in a speech input signal are different depending on the origin of the signal being a speech or a non-speech event. The method comprises steps for receiving a speech input signal, extracting at least one signal variation feature of the speech input signal, and applying a signal variation meter to the speech input signal for deriving a signal variation measure.

11 Claims, 2 Drawing Sheets

OTHER PUBLICATIONS

Bernardis et al: "Improving Posterior Based Confidence Measures in Hybrid HMM/ANN Speech Recognition Systems" Proc. of ICSLP'98, vol. 3, Oct. 1998, pp. 318-321, XP007000216.

Kamppari et al: "Word and phone level acoustic confidence scoring" Proc. of ICASSP'00, vol. 3, Jun. 5, 2000, pp. 1799-1802, XP010507710.

Benitez et al: "Different confidence measures for word verification in speech recognition" Speech Communication, Elsevier Science Publishers, Amsterdam, NL, vol. 32, No. 1-2, Sep. 2000, pp. 79-94, XP004216247.

\* cited by examiner

SIGNAL VARIATION FEATURE BASED CONFIDENCE MEASURE

BACKGROUND OF THE INVENTION

In speech recognition systems articulated sounds or utterances, respectively, are converted in written language by interpreting a respective speech signal. Misinterpretations which are usually referred to as recognition errors frequently occur with state-of-the-art speech recognition systems when used in a noisy environment. Ambient noise superimposing an input speech signal either modifies the characteristic of the input signal or may mistakenly be interpreted as a phoneme by a speech recogniser.

In order to detect if misrecognitions occur, so called confidence measures are used. A confidence measure judges the reliability with which a word or sub-word corresponds to a particular part of a signal. The word or sub-word is then accepted or rejected by the recognition process on the base of the confidence measure calculated for it.

As many different expressions sound very similar, there are often several alternatives possible for interpreting a certain utterance. To decide for one in particular, a confidence measure is e.g. calculated as the likelihood with which a certain expression corresponds to a respective utterance. This is usually accomplished by some form of special statistical hypothesis testing. These processes are usually very complicated, particularly as a phoneme can undergo certain acoustic variations under the influence of neighbouring phonemes, an effect which is known as coarticulation.

But also non-speech events, like the above mentioned ambient noise superimposing a speech signal result in an acoustic variation of the speech signal. A correct identification of the word or sub-word being the speech signal's written equivalent is therefore an elaborate task which is yet not been brought to a satisfactory solution.

It is therefore an object of the present invention to propose a system for improving the detection of recognition errors in a speech recognition system.

SUMMARY OF THE INVENTION

The above object is achieved by the invention as defined in the independent claims.

The characteristic features of a speech signal are quite different to those of a non-speech signal like e.g. ambient noise or noise bursts. In contrast to a non-speech signal, the quasi-periodic behaviour of a speech signal results in comparatively small signal variation. A rapid change or considerable variation in normally steady parts of a speech input signal therefore most likely indicates the presence of a non-speech component.

BRIEF DESCRIPTION OF THE DRAWINGS

Based on this insight, the above defined object is achieved by a method for predicting a misrecognition in a speech recognition system with steps for receiving a speech input signal, extracting at least one signal variation feature of the speech input signal, and applying a signal variation meter to the speech input signal for deriving a signal variation measure.

DETAILED DESCRIPTION OF THE INVENTION

The above object is further achieved by a Computer-software-product for defining a confidence measure for a recognition hypothesis concerning a speech input signal in a speech recognition system. The computer-software-product comprises hereto a series of state elements which are adapted to be processed by a data processing means such, that a method according the present invention may be executed thereon to form a confidence measure evaluation system.

Additional advantageous features of the present invention are claimed in the respective sub-claims.

The signal variation meter is advantageously applied to a sub-word of the speech input signal, particularly to a frame, a state or a phoneme as described below. According to an advantageous development, the signal variation measures derived for two or more sub-words of the speech input signal are combined to form a confidence measure. Hereby, the combination of the signal variation measures derived for two or more sub-words of a speech input signal may preferably be based on an arithmetic mean, geometric mean, maximum value, minimum value or on a dispersion measure, whereby the dispersion measure is formed by a range, standard deviation or relative dispersion.

The signal variation meter is effectively based on a Unique State Ratio, Same State Ratio, Unique State Entropy, Average Spectral Variation, Spectral Mismatch Distance or State Length One Ratio evaluation or a combination of two or more of these.

According to a further advantageous embodiment of the present invention, the extraction of the signal variation is based on a spectral feature derived from the speech input signal, whereby the extraction of the signal variation may suitably be based on a phoneme alignment of a Hidden Markov Model based speech recognition hypothesis.

Figure 1:
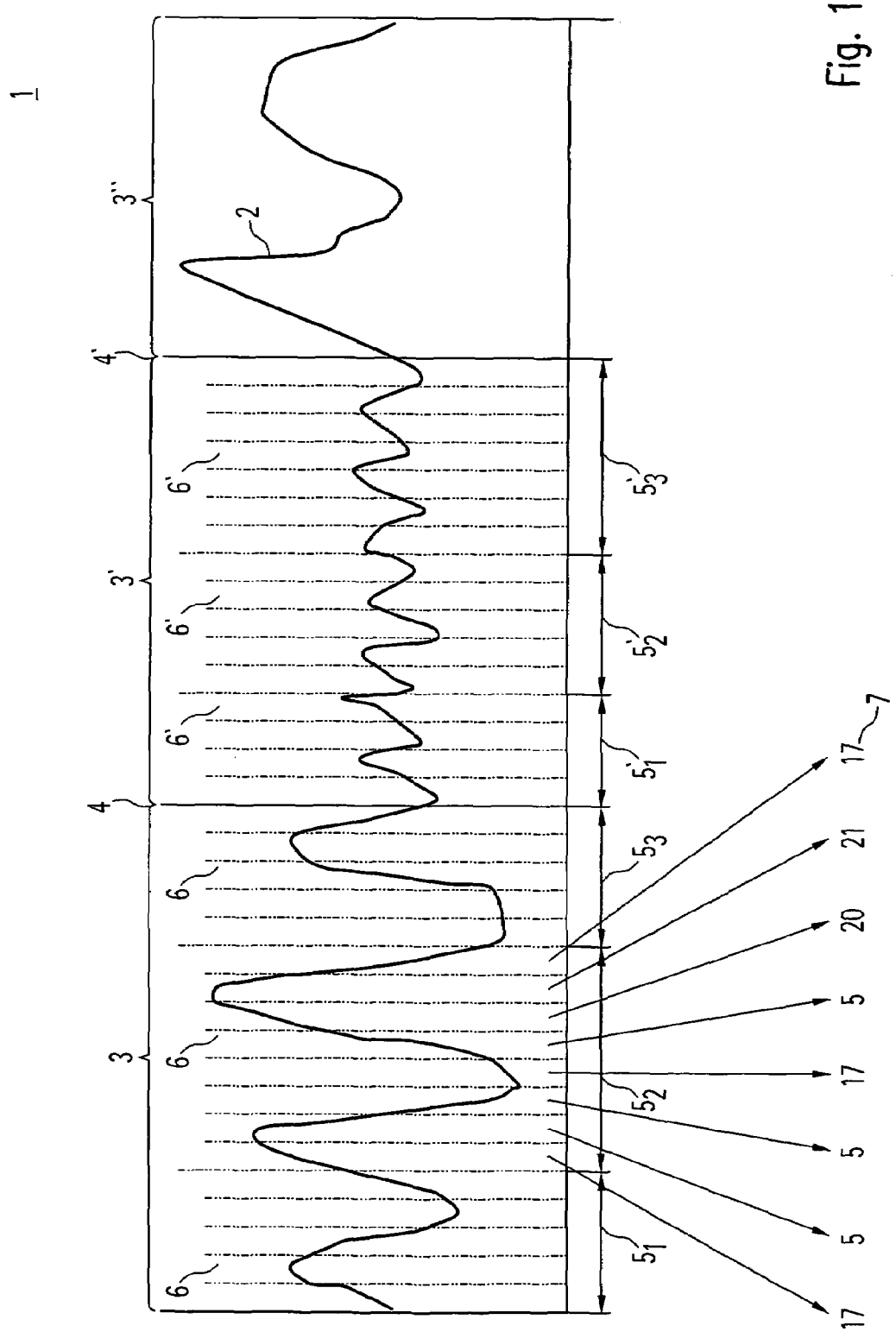
Figure 2:
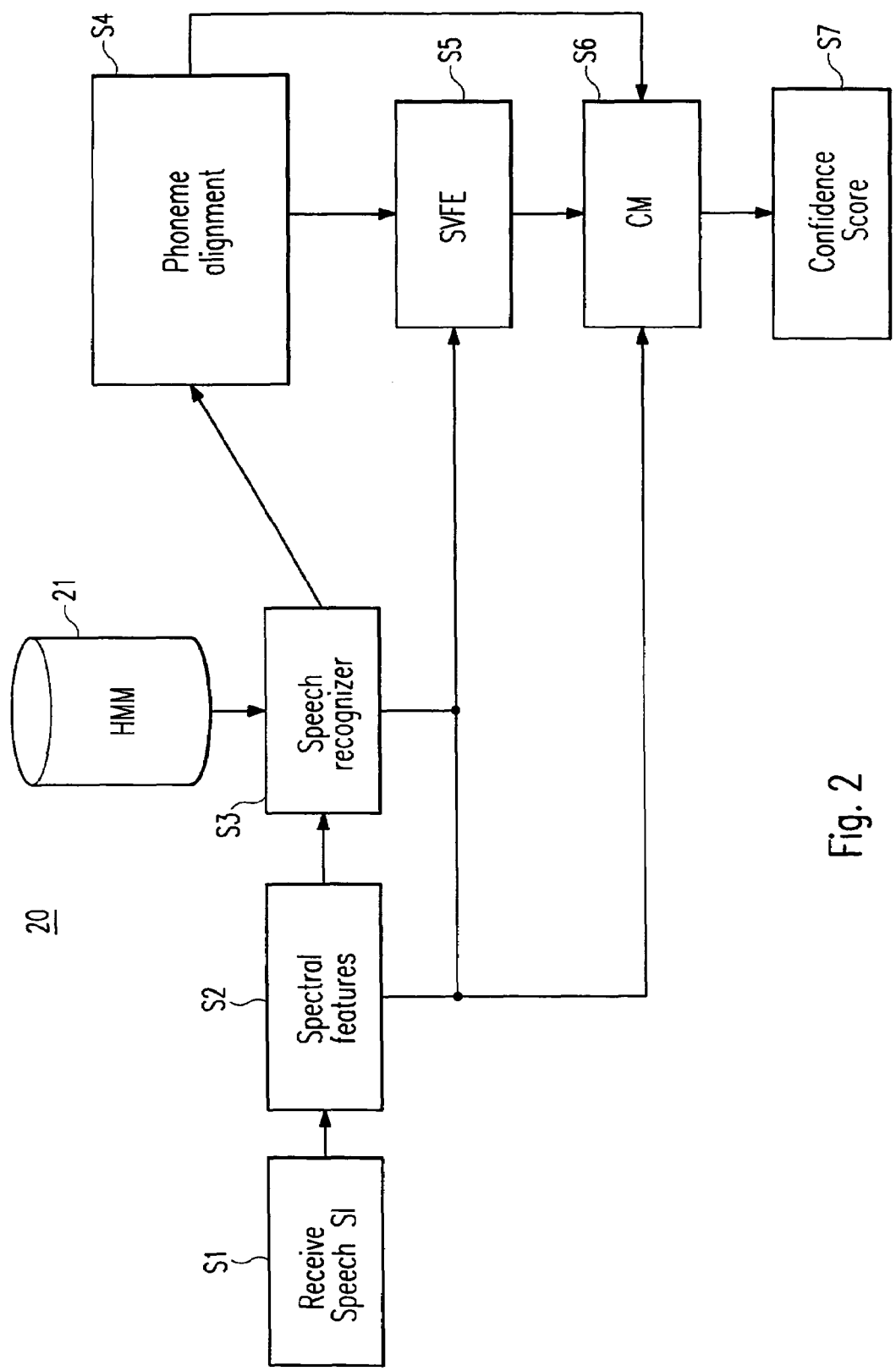

In the following, the present invention will be explained in detail and by way of example only, with reference to the attached Figures, wherein FIG. 1 shows a speech input signal with an indication of several subdivisions as for example used to derive a signal variation measure, and FIG. 2 shows a system for determining a confidence measure with a signal variation metering according to the present invention.

The diagram 1 of FIG. 1 shows part of a speech input signal 2 in an amplitude versus time representation. The speech input signal 2 is divided into several phonemes 3, 3' and 3" which are separated from each other by phoneme boundaries 4 and 4'. A phoneme is a sound characterised as the minimal word distinguishing signal like e.g. a b in contrast to a p. It may already represent a sub-word like for instance a syllable but usually it is a smaller word component. The term sub-word is used within this specification without any restriction and to indicate that only a part of a word in its acoustical or written representation is referred to.

For the speech recognition process, each phoneme is subdivided into so called states $5_1$, $5_2$, $5_3$, and $5'_1$, $5'_2$, $5'_3$ etc., and each state is further subdivided into the smallest analysing unit called frame 6 or 6', respectively. The recognition process looks for matches of a recorded signal form to the input signal within a state $5_2$. Usually, there will be no exact match which means that the recorded signal form will deviate from the speech input signal 2 in one or more frames 6 of a respective state $5_2$. Different recorded signals forms are therefore compared to the input signal 2 within a state $5_2$ of interest, and the matching is controlled on the basis of the frames 6 present in that state 5₂. Different recorded signal forms are therefore likely to form the respective best match in different frames 6 of a state 5₂. This is indicated in FIG. 1 where each recorded signal form is referenced by an identification number 7. While the recorded signal form number '17' produces a good match in the first, fourth and last frame 6 of state 5₂, the recorded signal form number '5' fits best in the second, third and fifth frame. The third last frame is found to match with the recorded signal form number '20', and the last but one frame with number '21'.

The described deviation of the speech input signal 2 from a recorded signal within the level of a state unit 5₂ is mostly caused by non-speech events like e.g. background noise insertions or changes in the mood of the person talking. A match will therefore seldom be perfect but rather tainted with a certain variation or uncertainty. Even for the best match there remains a certain probability for it being wrong.

To improve the accuracy of a confidence measure system the present invention introduces a characterisation of the reliability of each detected match. For the characterisation a hypothesis is derived for assessing the reliability of each match found. The hypothesis forms a statement about a certain match being probably right or wrong. It usually takes on the form of a numerical value for an easy further processing by a speech recognition system. The value of the hypothesis corresponds to a judgement which may be expressed in colloquial terms as e.g. very certain, certain, possibly certain, perhaps certain, more or less unlikely, completely unlikely or something like that.

According to the present invention a hypothesis is generated by utilising signal variation meters which consider the speech signal variations down to a frame 6 level. A signal variation meter as it is understood in the context of this specification uses the matching results for each frame 6 in a state 5₂ to extracts signal variation features from the speech input signal 2 so as to ascertain a value characterising the best match regarding the signal component originating from a speech event only. A respective signal variation meter is preferably used within a confidence measure evaluation unit of a speech recognition system.

The following signal variation meters, which are explained in detail below are proposed to generate a hypothesis according to the previously explained: Unique State Ratio (USR), Same State Ratio (SSR), Unique State Entropy (USE), Average Spectral Variation (ASV), Spectral Mismatch Distance (SMD), and State Length One Ratio (SLOR).

Unique State Ratio: For each frame 6 in a state 52, the identity 7 of the recorded signal form which matches the speech input signal 2 therein best, i.e. the best frame match, is identified. Next, the number of different best frame matches for a state 52 is counted and divided by the number of frames 6 present within said state 52. An example can be given with reference to FIG. 1. The state 520 of the first phoneme 3 is composed of eight frames 6. The best frame matches differ from frame to frame with a total of four different identities, namely '17', '5', '20', and '21'. As there are altogether eight frames 6 present in state 52, its USR is computed to 0.5.

Same State Ratio: Like before, first the best frame matches are identified for each frame 6 within a state 5₂. Next, the number of frames having the same best frame match are determined. The highest count is then divided by the number of frames 6 present in the respective state 5₂. In the example illustrated in FIG. 1, the best frame matches '17' and '5' are each identified for three different frames respectively. The other two, '20' and '21' each only for one frame 6. The highest count therefore amounts to three, resulting in an SSR=0.375.

The Unique State Entropy is defined as:

$$USE = \frac{-\sum_{s}^{N_s}\left(\frac{c(s)}{N} \cdot \log\left(\frac{c(s)}{N}\right)\right)}{\log(N_s)}, \quad (1)$$

wherein $N_s$ denotes the total number of different recorded signal forms in a state as e.g. 5₂, N the number of frames 6, 6' within the state (e.g. 5₂), c(s) the count of frames for a respective recorded signal form in the state (e.g. 5₂), and 's' is the identification number of a recorded signal form. In the example of FIG. 1, four different recorded signal forms were used to match state 5₂, namely the signal forms with the identification numbers 7 of '17', '5', '20', and '21'. Hence $N_s=4$, the total number of frames (N) constituting state 5₂ is 8, and c(17)=3, c(5)=3, c(20)=1, c(21)=1. If the calculation is performed on the basis of one recorded signal form only in one state, eg., i.e. N=1, a division-by-zero problem arises, which is handled by setting the value for USE to 0 for this case.

The Average Spectral Variation between two adjacent frames 6 in a state 5₂ represents a sort of audio content analysis based on a spectral flux determination. It is defined by:

$$ASV = \frac{1}{N_{coef} \cdot (W_{sw} - 1)} \sum_{n=bf_{sw}}^{ef_{sw}} \sum_{k=1}^{N_{coef}} [\log(|F_n(k)| + 1) - \log(|F_{n-1}(k)| + 1)]^2; \quad (2)$$

Herein n signifies the frame index in the state 5₂ unit sw; Its lower value is the begin frame $bf_{sw}$ and its upper value is the end frame $ef_{sw}$ of the respective state unit sw. $W_{sw}$ denotes the number of frames within said state 5₂, $N_{coef}$ the total number of the spectral coefficients, and $|F_n(k)|$ the amplitude spectrum of the $n^{th}$ frame corresponding to the $k^{th}$ spectral coefficient.

Instead of an amplitude spectrum like in the example given, other spectral vectors such as a Mel Frequency Cepstrum Coefficient (MFCC) may be used for the spectral representation.

Spectral Mismatch Distance: The amount of mismatch between a hypothesis for the best match formed by a recorded signal form and the speech input signal 2 in a respective state 5₂, is preferably determined by a distance meter. By e.g. using the average Euclidean distance, the Spectral Mismatch Distance between the best Gaussian frame match μ(k) of the hypothesis and the spectral vectors in the state 5₂ unit sw is $$SMD = \frac{1}{W_{sw}} \sum_{n=bf_{sw}}^{ef_{sw}} \left(\sum_{k=1}^{N_{coef}} (F_n(k) - \mu(k))^2\right)^{1/2}. \quad (3)$$

Using the average Mahalanobis Distance, the SMD between the best Gaussian frame match of the hypothesis and the spectral vectors in the state 5₂ unit sw will become:

$$SMD = \frac{1}{W_{sw}} \sum_{n=bf_{sw}}^{ef_{sw}} \left( \sum_{k=1}^{N_{coef}} \frac{(F_n(k) - \mu(k))^2}{\sigma(k)} \right)^{1/2}, \quad (4)$$

which corresponds to a weighted Euclidian distance variance.

Like mentioned before with reference to the Average Spectral Variation meter, other spectral vectors such as an MFCC can be used for the spectral representation.

The State Length One Ratio is given by the number of best frame matches in a state $5_2$ which last for only one frame 6 divided by the number of frames N within said state $5_2$. In the example of FIG. 1 only the sixth (with an identification number 7 of '20') and the seventh frame (with an identification number 7 of '21') of state $5_2$ occur just once. Therefore two frames fulfil the condition, and with the total number of frames N within state $5_2$ being 8, the State Length One Ratio amounts to 0.25.

All signal variation meters described up to now may be combined to derive a confidence measure for the speech input signal 2 to be recognised. The confidence metering may either be based on a state $5_2$-level or on a higher level. Particularly, when an utterance consist of more than one state $5_2$, the confidence measures obtained for subsequent states $5_2$ may be advantageously combined to form a higher level confidence measure. The higher level may be a phoneme, a series of phonemes, a word or a complete utterance. The combination may be based on an arithmetic or geometric mean of a series of confidence measures calculated on a state $5_2$-level, but also on a maximum or minimum determination or a dispersion measure as e.g. a range, standard deviation, relative dispersion or the like. The dispersion measures are used to extract the statistical distribution of a state $5_2$ unit signal variation measure in a word and/or utterance hypothesis.

A confidence score may be derived directly from one of the above described signal variation meters or a combination thereof, or by combining one or more signal variation meters with a state-of-the art classifier like a multilayer perceptron.

The application of a signal variation meter according to the present invention is described with reference to FIG. 2. The flowchart 20 illustrates the individual steps of a speech recognition process yielding a confidence score or measure, respectively, according to the present invention. Beginning with step S1, a speech input signal 2 is received. Step S2 retrieves the spectral features from the speech input signal 2. This may be an amplitude spectrum or any other spectral vector such as for instance a Mel Frequency Cepstrum Coefficient. The spectral features derived in step S2 form the base for producing a recogniser hypothesis in step S3. The speech recogniser evaluating the hypothesis is based on a Hidden markov Model (HMM) 21. A phoneme alignment applied in step S4 provides the best match information based on an identification of at least framewise matching recorded signal forms for a state $5_2$. In step S5, the results from the spectral feature analysis of step S2 to S4, the recogniser hypothesis of step S3, and the phone alignment of step S4 are merged by one or more of the above described signal variation meters to perform a signal variation feature extraction. Using results obtained in step S2 to S4, the confidence Meter CM transforms in step S6 the result of step S5 into a confidence measure delivered as a confidence score in step S7. Although the usage of the results from S2, S3, and S4 in step S6 is not mandatory, it is preferred, since it improves the speech recognition significantly.

The invention claimed is:

1. A method for detecting a misrecognition in a speech recognition system, the method comprising:
    receiving a speech input signal;
    dividing the received speech input signal into a number of phonemes;
    subdividing each phoneme into a number of states;
    subdividing each state into a number of frames;
    applying a signal variation meter to each frame of the received speech input signal by comparing an input signal form of each frame to a recorded signal form and by extracting a signal variation feature from a result of the comparing for each frame, each signal variation feature being a measure of the signal variation meter and a characterization of a reliability of the result of the comparing for each frame; and
    deriving a confidence measure by combining two or more of said signal variation measures.

2. The method according to claim 1, wherein said combination of the signal variation measures derived for two or more sub-words of the speech input signal is based on an arithmetic mean, geometric mean, maximum value, minimum value, or on a dispersion measure.

3. The method according to claim 2, wherein said dispersion measure is a range, standard deviation, or relative dispersion.

4. The method according to claim 1, wherein the signal variation meter is based on a Unique State Ratio evaluation.

5. The method according to claim 1, wherein the signal variation meter is based on a Same State Ratio evaluation.

6. The method according to claim 1, wherein the signal variation meter is based on a Unique State Entropy evaluation.

7. The method according to claim 1, wherein the signal variation meter is based on an Average Spectral Variation valuation.

8. The method according to claim 1, wherein the signal variation meter is based on a Spectral Mismatch Distance evaluation.

9. The method according to claim 1, wherein the signal variation meter is based on a State Length One Ratio evaluation.

10. The method according to claim 1, wherein the extraction of the signal variation is based on a spectral feature derived from the speech input signal.

11. The method according to claim 10, wherein the extraction of the signal variation is further based on a phoneme alignment of a Hidden Markov Model based on a speech recognition hypothesis.

* * * * *